(12) United States Patent
Park et al.

(10) Patent No.: US 8,298,416 B2
(45) Date of Patent: Oct. 30, 2012

(54) APPARATUS FOR DEODORIZING SEWAGE TREATMENT PLANT SLUDGE BY USING NATIVE MICROORGANISMS

(75) Inventors: Wan Cheol Park, Seoul (KR); Tae Hyung Kim, Seongnam-si (KR); Mi Ae Lee, Seoul (KR); Kyung Lyong Choi, Jinju-si (KR)

(73) Assignee: Korea Institute of Science and Technology, Seoul (KR)

( * ) Notice: Subject to any disclaimer, the term of this patent is extended or adjusted under 35 U.S.C. 154(b) by 477 days.

(21) Appl. No.: 12/711,382

(22) Filed: Feb. 24, 2010

(65) Prior Publication Data

US 2011/0203984 A1   Aug. 25, 2011

(51) Int. Cl.
*B01D 29/00* (2006.01)
*B01D 35/00* (2006.01)

(52) U.S. Cl. .................. 210/205; 210/209; 210/916

(58) Field of Classification Search .................. 210/205, 210/209, 916
See application file for complete search history.

(56) References Cited

U.S. PATENT DOCUMENTS 5,770,079 A * 6/1998 Haase ........................ 210/606
6,743,361 B1 * 6/2004 Doege et al. ............... 210/605

FOREIGN PATENT DOCUMENTS

KR    10-0513268    6/2004

OTHER PUBLICATIONS

Korean Intellectual Property Office, Office Action dated Oct. 19, 2010.

* cited by examiner

*Primary Examiner* — Chester Barry
(74) *Attorney, Agent, or Firm* — Ladas & Parry LLP

(57) ABSTRACT

The present invention relates to a deodorizing apparatus using native microorganisms. Specifically, the present invention relates to a deodorizing apparatus using native microorganisms for removal of malodors of sewage treatment plant sludge, comprising a native microorganism activating tank, where a colony of the native microorganisms in a spore state is germinated and activated through a proliferation process under conditions where oxygen and organic materials are supplied, and the native microorganisms returned from a second deodorizing tank is further activated; and a first and a second deodorizing tanks which remove malodorants from untreated matter under conditions where oxygen and the activated native microorganisms are continuously supplied. The deodorizing apparatus of the present invention, which is an eco-friendly and economical method using native microorganisms, can effectively remove malodor generated from various types of sludge including a primary sludge, a secondary sludge, a sludge containing night soil, etc. produced from sewage treatment plants.

15 Claims, 1 Drawing Sheet

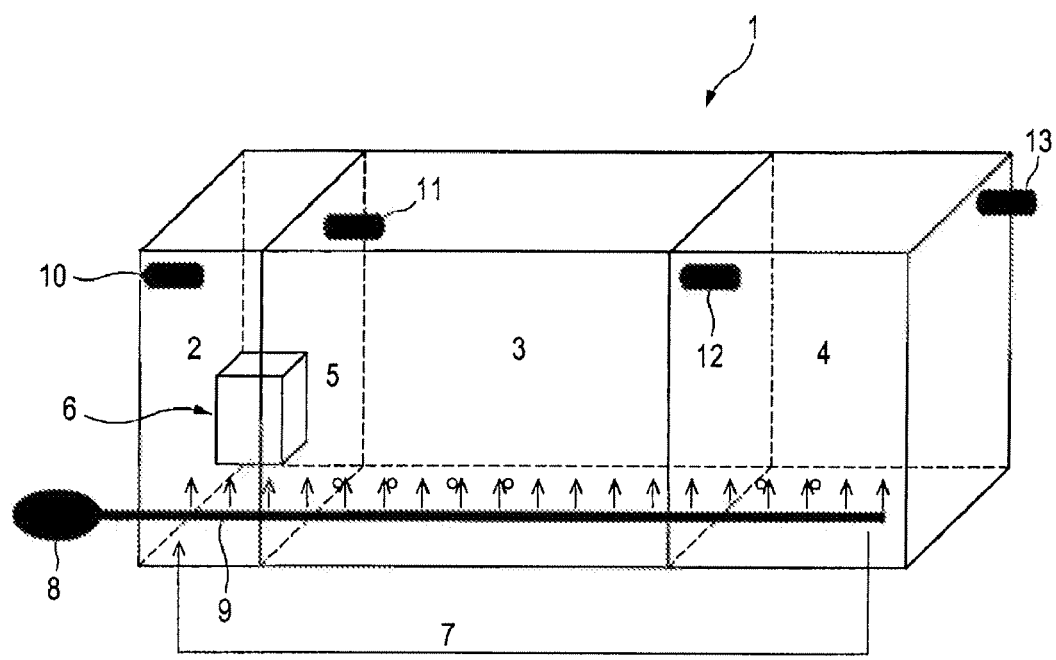

APPARATUS FOR DEODORIZING SEWAGE TREATMENT PLANT SLUDGE BY USING NATIVE MICROORGANISMS

FIELD OF THE INVENTION

The present invention relates to a deodorizing apparatus that can effectively remove various sludge malodors originating from a sewage treatment plant in an eco-friendly manner by using native microorganisms.

BACKGROUND OF THE INVENTION

The Korean Waste Management Act defines "sludge" as containing less than 95% moisture or more than 5% solids. Sludges produced from municipal domestic wastewaters have similar characteristics because the properties of influent waters are within a certain range. The types of sludge include raw sludge, which is removed from the first sedimentation tank, and excess sludge (activated sludge), which is removed from the second sedimentation tank. At some sewage treatment plants, sludge is often treated together with night soil that flows into the plants.

The dehydrated cake which is finally produced at sewage treatment plants varies depending on the sludge treatment process. Generally, the amounts of raw sludge (primary sludge) and excess sludge (secondary sludge) produced from the water treatment process of a standard activated sludge method account for about 1% of the total inflow. About 40-90% of the solids within the sludge produced by this process contains organic materials, and has a moisture content of 97-99%, resulting in numerous problems in terms of disposal. That is, the large quantity of organic materials contained in the sludge is extremely unstable and prone to decomposition, and during decomposition, not only generates malodors but also can convert into substances that are hazardous to the human body and ecosystem, creating hygiene issues.

In particular, because malodor is generally composed of complex substances with multiple components, it is difficult to determine what type of malodor has how much effect on the human body, based only on the strength of malodor. It has been reported that malodors emitted from sewage treatment plants adversely affect both the mental and physical states (including respiratory, circulatory, reproductive, and endocrine systems) of nearby residents in various ways. Accordingly, it is necessary to create a turning point where the residents recognize that a sewage treatment plant is not an unwanted facility but rather an eco-friendly facility, by effectively controlling the malodors of sludge generated from sewage treatment plants.

The Korean government has pursued the "Measures for Pure Water Supply" action since the early 1990s, and has actively pushed forward public sewage treatment plant projects in regions like densely inhabited cities. As a result, about 83.5% (as of the end of 2005) of domestic wastewater is treated at the public sewage treatment plants. As of the end of 2005, a total of 294 public sewage treatment plants with a capacity of 22,568 tons have been established in Korea. The amount of sewage sludge produced in Korea is generally 0.3 kg per 1 $m^3$ of sewage, where the moisture content is about 78% and the organic material content is about 47%. When converted to a daily sewage amount, this corresponds to 6,770 tons of sewage sludge per day.

Recently, studies relating to methods for decomposing malodorants (mainly, organic materials) via enzymatic reactions by microorganisms are being actively carried out in advanced countries including the U.S. Microorganisms that can be used for the biological decomposition of malodorants can be largely divided into two groups—autotrophic bacteria and heterotrophic bacteria. Autotrophic bacteria are microorganisms which can grow only with inorganic materials; for example, sulfur bacteria can synthesize the necessary complex organic materials in the presence of only a small amount of inorganic salts, water and carbon dioxide. Accordingly, autotrophic bacteria are useful for the conversion of inorganic materials. Nonetheless, due to their slow energy conversion process and low growth rate, there have been no reports so far of a case where autotrophic bacteria have been successively used for the conversion of inorganic materials. Moreover, it is known that this type of bacteria can be applied to only a few simple processes.

Meanwhile, heterotrophic bacteria are microorganisms which obtain nutrients and energy necessary for growth by decomposing a carbon source in the form of an organism and other organic materials. Although such heterotrophic bacteria are particularly well adaptable to the conversion of organic contaminants, it is very difficult to enumerate every bacterium suitable for the optimal conversion of a specific contaminant. However, the conversion process by those heterotrophic bacteria is much faster than that by autotrophic bacteria. Since the conversion of organic compounds by heterotrophic bacteria requires oxygen, in most cases, the introduction of oxygen and bacteria acts as a limiting step.

Based on the above, in removing malodors produced from sewage treatment plant sludge, a biological process using microorganisms is considered as the most economical and eco-friendly method with no secondary contamination. Thus, in order to remove malodors produced from sewage treatment plant sludge, the inventors of the present invention developed a deodorizing apparatus using native microorganisms and attempted to solve the problems relating to malodors generated from the primary sludge, secondary sludge, primary sludge containing night soil, etc. produced from the sewage treatment plant, and from the concentration tank, dehydrator, dehydrated cake, etc. of the sewage treatment plant.

SUMMARY OF THE INVENTION

An objective of the present invention is to provide a deodorizing apparatus using native microorganisms for effectively removing malodors generated from sewage treatment plant sludge in an eco-friendly manner.

In order to achieve the above objective, the present invention provides a deodorizing apparatus that can effectively remove malodors from various types of sludge including primary sludge, secondary sludge, night soil sludge, etc. produced from the sewage treatment plant, the concentration tank in which the above sludges are mixed, dehydrator, and/or dehydrated cake.

A deodorizing apparatus using native microorganisms for deodorizing sewage treatment plant sludge according to the present invention can remove malodors of various types of sludge including primary sludge, secondary sludge, night soil sludge, etc. produced from the sewage treatment plant, the concentration tank in which the sludges are mixed, dehydrator, and/or dehydrated cake, by using native microorganisms in an eco-friendly and effective manner.

BRIEF DESCRIPTION OF THE DRAWING

FIG. 1 is a schematic diagram showing a deodorizing apparatus using native microorganisms according to the present invention designed for removing malodors of sewage treatment plant sludge.

DETAILED DESCRIPTION OF THE INVENTION

A deodorizing apparatus using native microorganisms according to the present invention is an apparatus for deodorizing sewage treatment plant sludge by activating native microorganisms.

The apparatus comprises:

a native microorganism activating tank, where colonies of spores, which were made by culturing a *Bacillus* sp. microorganism, are germinated and activated through a proliferation process under conditions where oxygen and organic materials are supplied, and native microorganisms returned from a second deodorizing tank is further activated;

a first deodorizing tank which preliminarily removes malodorants from untreated matter which has passed through the native microorganism activating tank under conditions where oxygen and activated native microorganisms are continuously supplied; and a second deodorizing tank which completely removes malodorants from untreated matter which has passed through the first deodorizing tank under conditions where oxygen and activated native microorganisms are continuously supplied.

Hereinafter, the present invention is described in detail by referring to the deodorizing apparatus using microorganisms for removing malodor from sewage treatment plant sludge illustrated in the attached drawing.

FIG. 1 is a schematic diagram showing a deodorizing apparatus using native microorganisms according to the present invention which is designed to remove malodors of sewage treatment plant sludge. The deodorizing apparatus 1 using native microorganisms according to the present invention comprises three reaction tanks—a native microorganism activating tank 2, a first deodorizing tank 3 and a second deodorizing tank 4, where a native microorganism activator 5 is placed within the microorganism activating tank 2.

The deodorizing apparatus 1 using native microorganisms according to the present invention is an apparatus designed to effectively treat malodors generated from various types of sludge produced from sewage treatment plants, i.e., a primary sludge (raw sludge) produced from a first sedimentation tank during a water treatment process according to a standard activated sludge method, a primary sludge containing night soil which is fed into the sewage treatment plant for consolidated treatment, and a secondary sludge (activated sludge) mainly containing biological microorganisms, by using native microorganisms.

First, various types of sludge produced from sewage treatment plants flow through a raw water inlet 10 into the native microorganism activating tank 2 of the deodorizing apparatus 1 using native microorganisms according to the present invention. In the native microorganism activating tank 2, the native microorganism activator 5 filled with colonies of native microorganisms 6 is installed. Colonies of native microorganisms 6 according to the present invention are prepared by culturing *Bacillus subtilis* BSDL1 (Deposit No.: KFCC-11399P) isolated and identified from Cheonggugjang (soybean paste) and *Bacillus megaterium* DSM3 (Deposit No.: KFCC-11402P) isolated and identified from leaf-mould in the spore state.

These *Bacillus* sp. microorganisms, which have excellent nitrification and denitrification activities, can efficiently get rid of organic materials and nutrients, particularly nitrogen, from wastewater, and effectively remove malodors generated from the removal procedure. Moreover, these microorganisms activate colonies of native microorganisms present in the subject wastewater and make an environment that enables the activated microorganisms to treat the wastewater by themselves. Thus, a more effective removal of malodors generated from wastewater treatment processes can be expected.

The colony of native microorganisms 6 according to the present invention is prepared in the spore state by culturing a large quantity of *Bacillus subtilis* BSDL1 and *Bacillus megaterium* DSM3 showing excellent nitrification and denitrification activities, and concentrating and molding the culture broth. Specifically, the above strains are inoculated into a nutrient broth for cell proliferation and cultured at 24-26° C. for 24 to 48 hours. Subsequently, the starter culture broth is inoculated into a nutrient broth for fermentation and then cultured at a culture temperature of 24-26° C., pH of 6.6-7.0, and where the saturation value for dissolved oxygen concentration is maintained between 10-60 in a shaker at 180 to 200 rpm, until endospores are completely formed. The above microorganism culture broth is concentrated until the microorganisms have an optical density (OD) value of from 0.5 to 1.8 from the exponential phase to stationary phase when measured with a UV spectrophotometer. This concentrated culture broth is mixed in the liquid state with various inorganic materials necessary for microorganism growth and then molded to prepare a colony of microorganisms. The colony of native microorganisms prepared as above contains 5-6% of the concentrated culture broth of *Bacillus subtilis* BSDL1 and *Bacillus megaterium* DSM3 based on the weight of inorganic materials.

Since the colony of native microorganisms 6 according to the present invention is present in the spore state, it can well adapt to and survive in the extreme environment created by the inflowing sludge. Further, it can be activated by the later supplied oxygen and organic materials, resulting in germination of the spores and activation through proliferation, and further causes the activation of microorganisms contained in the sludge. Thus, the colony of native microorganisms can be effectively used for removal of malodors generated from sewage treatment plant sludge.

The native microorganism activator 5 filled with the colony of microorganisms 6 may be made of chemically stable stainless material and have a structure with multiple holes, so that the native microorganisms molded in a spore state within the colony of native microorganisms 6 can be efficiently supplied with oxygen and organic materials fed into the native microorganism activating tank 2 and can achieve germination of the spores and activation through growth and proliferation processes. The activated native microorganisms are dissolved in the native microorganism activating tank 2, mixed with sludge that enters through the raw water inlet 10, and supplied with organic materials.

In the native microorganism activating tank 2, oxygen is supplied through a blower 8 and a diffuser 9, where it may be desirable to maintain a dissolved oxygen (DO) level of from 0.5 to 0.6 mg/l in the native microorganism activating tank 2. A dissolved oxygen level of less than 0.5 may interfere with the activity of microorganisms. A dissolved oxygen level of greater than 0.6 may be helpful in terms of microorganism activity, but is uneconomical because of the high maintenance costs.

The *Bacillus subtilis* BSDL1 and *Bacillus megaterium* DSM3 within the colony of microorganisms 6 filled in the native microorganism activator 5 are germinated by the supply of organic materials and oxygen and activated through growth and proliferation processes. Further, in the native microorganism activating tank 2, there is a large amount of native microorganisms which have been activated in the native microorganism activator 5 and which have been returned from the second deactivating tank 4 through the return line 7.

The untreated matter that passed through the native microorganism activating tank 2 enters the first deodorizing tank 3 through the first deodorizing tank inlet 11. The first deodorizing tank 3 is a reaction tank where the native microorganisms activated in the native microorganism activating tank 2 using oxygen continuously supplied from the blower 8 through the diffuser 9 preliminarily remove malodorants from the sludge. It is desirable to maintain a dissolved oxygen level of between 0.4 and 0.5 mg/l in the first deodorizing tank 3.

The untreated matter that passed through the first deodorizing tank 3 enters the second deodorizing tank 4 through the second deodorizing tank inlet 12. The second deodorizing tank 4 is a reaction tank where the native microorganisms activated under conditions where oxygen is continuously supplied through the diffuser 9 from the blower 8 secondarily remove malodorants remaining in the sludge that went through the first treatment process. It is desirable to maintain a dissolved oxygen level of between 0.3 and 0.4 mg/l in the second deodorizing tank 4.

The second deodorizing tank 4 returns 10 to 25% of the untreated matter in the second deodorizing tank 4 through the return line 7 to the native microorganisms activating tank 2 in order to successively and continuously supply the activated native microorganisms to the native microorganism activating tank 2. The return rate may be 10 to 15%, based on the amount of inflow, in case of a sewage treatment plant sludge containing only a primary sludge and a secondary sludge, and 20 to 25% in case of a sewage treatment plant sludge containing a primary sludge containing night soil and a secondary sludge. In addition, the return line 7 has a filter through which solids such as sludge are filtered and the remaining liquid containing only the activated native microorganisms is returned to the native microorganism activating tank 2.

The deodorizing apparatus using native microorganisms according to the present invention can further comprise a raw water inlet 10 through which the sludge enters the native microorganism activating tank 2; a first deodorizing tank inlet 11 through which the activated native microorganisms and sludge enter the first deodorizing tank 3; a second deodorizing tank inlet 12 through which the activated native microorganisms and sludge enter the second deodorizing tank 4; and a deodorizing tank outlet 13 which discharges the completely deodorized sludge from the second deodorizing tank 4. These components may be designed to be arranged in a zigzag manner based on the diagonal line so that the untreated matter can effectively utilize the entire area of the reaction tanks of the deodorizing apparatus 1 using native microorganisms.

In the deodorizing apparatus 1 using native microorganisms according to the present invention comprising the native microorganism activating tank 2, the first deodorizing tank 3 and the second deodorizing tank 4, it is desirable to adjust the retention time in all reaction tanks between 5-6 hours in case of a sewage treatment plant sludge comprising only a primary sludge and a secondary sludge, and between 7-8 hours in case of a sewage treatment sludge comprising a primary sludge containing night soil and a secondary sludge. It is desirable to configure the capacity ratio of the respective reaction tanks to 1:6:3 (native microorganism activating tank 2: first deodorizing tank 3: second deodorizing tank 4).

The deodorizing apparatus using native microorganisms according to the present invention is excellent in deodorizing sludge generated from the sewage treatment plant's treatment processes, because it uses *Bacillus subtilis* BSDL1 and *Bacillus megaterium* DSM3 which have an excellent nitrification and denitrification activities, and thus, can be very well applied to the treatment of sewage, sanitary sewage, night soil, livestock wastewater or industrial wastewater, etc.

Hereinafter, the present invention is explained in further detail by referring to the working examples. The following examples are provided only to more specifically explain the present invention and are by no means intended to limit the scope of the present invention.

EXAMPLES

Example 1

Preparation of Native Microorganism Colonies

In order to use in the deodorizing apparatus using native microorganisms according to the present invention which is designed to remove malodors of sewage treatment plant sludge, colonies of native microorganisms were prepared as follows.

First, a 2,000 l nutrient broth for fermentation (3 g beef extract, 5 g enzymatic digest of gelatin, pH 6.8±0.2) was prepared and poured into a fermentation tank having a 3,000 l capacity, and then sterilized using high pressure steam at 121° C. for 15 minutes. *Bacillus subtilis* BSDL1 (KFCC-11399P) and *Bacillus megaterium* DSM3 (KFCC-11402P) were cultured in a nutrient broth for cell proliferation for 24 hours and the culture broth were inoculated into the above fermentation tank and then cultured until endospores were completely formed at a culture temperature of 24-26° C., pH of 6.6-7.0, where the amount of air flow and agitation speed were controlled to maintain a saturation value for dissolved oxygen concentration of between 10-60. Each of the microorganism culture broth was concentrated until the microorganisms had an optical density value of from 0.5 to 1.8 from the exponential phase (growth phase) to stationary phase when measured with a UV spectrophotometer. The concentrated microorganism culture broth in the liquid state were molded together with various inorganic materials necessary for microorganism growth to prepare the colony of microorganisms. The colony of native microorganisms prepared as above contained 5 to 6% of concentrated culture broth of *Bacillus subtilis* BSDL1 and *Bacillus megaterium* DSM3 based on the weight of inorganic materials.

Example 2

Evaluation of Deodorizing Effect Using Artificial Wastewater

To verify the deodorizing effect of the deodorizing apparatus using native microorganisms according to the present invention which is designed to remove the malodors of sewage treatment plant sludge, the deodorizing capability of a colony of native microorganisms was examined by carrying out experiments in a laboratory scale where malodors of artificial wastewater containing various malodorants were removed.

The deodorizing experiments were performed batchwise. Two 100 ml flasks containing artificial wastewater comprising 1.12 ppm of ammonia ($NH_3$), 12.6 ppb of hydrogen sulfide ($H_2S$), 1.2 ppb of methyl mercaptan ($CH_3SH$), and 7.2 ppb of methyl sulfide (($CH_3)_2S$) were prepared. To one flask, the colony of native microorganisms prepared according to Example 1 above was added and then the flask was sealed, while the other flask was sealed without adding the colony of native microorganisms. Malodors generated from each flask were collected twice a day and analyzed by using gas chromatography (GC). The results are shown in Table 1 below.

TABLE 1

| Item | Comparative Experiments | | Allowable Emission Standards |
|---|---|---|---|
| | Without native microorganisms | With native microorganisms | |
| $NH_3$ | 1.12 ppm | 0.45 ppm | <1.0 ppm |
| $H_2S$ | 12.6 ppb | 5.9 ppb | <20 ppb |
| $CH_3SH$ | 1.2 ppb | 0.4 ppb | <2.0 ppb |
| $(CH_3)_2S$ | 7.2 ppb | 1.45 ppb | <10 ppb |

Table 1 above shows the gas chromatography results six days after the deodorizing experiments. The results confirmed that the colony of native microorganisms according to the present invention has an excellent deodorizing effect against the combination of $NH_3$, $H_2S$, $CH_3SH$ and $(CH_3)_2S$, which are the main causes of malodors of sewage treatment plants. Specifically, six days after the experiment, the flask with native microorganisms showed a removal of 60% $NH_3$, 53% $H_2S$, 67% $CH_3SH$ and 80% $(CH_3)_2S$ versus the original concentrations (in comparison with the flask without native microorganisms), satisfying all emission standards.

Example 3

Evaluation of Deodorizing Effect Using Sludge Containing Night Soil

In order to examine the deodorizing effect of the colony of native microorganisms prepared according to Example 1 above against the actual sludge, the following experiments were conducted with a primary sludge containing night soil and a secondary sludge as raw water.

Specifically, a reactor including a native microorganism activating tank, a first deodorizing tank and a second deodorizing tank having capacities and instruments as shown in Table 2 below was constructed with acryl. In the native microorganism activating tank, a native microorganism activator filled with the colony of native microorganisms prepared according to Example 1 above was installed. For each case of treatment processes with or without colony of native microorganisms of the present invention, the $(CH_3)_2S$ content in the primary sludge containing night soil and the secondary sludge was analyzed by gas chromatography. The retention time for the whole reaction tank was set to 8 hours and the effluents were collected at various time intervals and analyzed. Based on the results of previous research showing that it took 48 hours to completely activate the *Bacillus* sp. microorganisms inoculated in the spore state into the colony of native microorganisms, a deodorization tracking experiment was carried out for 48 hours.

TABLE 2

| Reactor/Apparatus | Dimensions | Remarks |
|---|---|---|
| Native microorganism activating tank | 5.0 L(L = 6.2 cm B = 20 cm, H = 40 cm) | spherical |
| First deodorizing tank | 30 L(L = 40 cm, B = 20 cm, H = 40 cm) | spherical |
| Second deodorizing tank | 15 L(L = 20 cm, B = 20 cm, H = 40 cm) | spherical |
| Native microorganism activator | 0.2 L(L = 5 cm, B = 5 cm, H = 10 cm) | spherical |
| pH-thermometer | Orione 250A | pH, temperature measurement |
| transfer pump | Master-flex pump | metering pump |
| blower | SPP-200GJ-H | 40 L/min |

TABLE 3

| | | | Time (h) | | | | |
|---|---|---|---|---|---|---|---|
| Item | | raw water | 3 | 6 | 9 | 12 | 24 | 48 |
| $(CH_3)_2S$ (ppb) | without native microorganisms | 30.24 | 10.6 | 7.81 | 6.72 | 6.33 | 3.94 | 3.52 |
| | with native microorganisms | | 6.94 | 5.01 | 3.54 | 0.54 | 0.31 | 0.15 |

As summarized in Table 3 above, during a retention time of 8 hours, the activities of native microorganisms increased as time progressed, resulting an increase in deodorizing efficiency. In particular, after 12 hours, the concentration of $(CH_3)_2S$ decreased to 0.54 ppb (98.2% deodorizing efficiency), indicating that the malodorants were completely removed. In the sensory experiment, it was also revealed that after 12 hours, malodors from sludge disappeared and only the microorganism odor remained.

As shown above, the specific embodiments of the present invention have been fully described. It will be apparent to those of ordinary knowledge in the art that such detailed descriptions merely show illustrative embodiments and are by no means intended to limit the scope of the invention, which is substantially defined by the claims and their equivalents thereof.

What is claimed:

1. A deodorizing apparatus using native microorganisms for effectively removing malodor of sewage treatment plant sludge, the apparatus comprising:
    a native microorganism activating tank;
    a first deodorizing tank; and
    a second deodorizing tank, wherein a microorganism activator filled with a colony of native microorganisms is placed in the native microorganism activating tank.

2. The deodorizing apparatus using native microorganisms according to claim 1 comprising:
    a native microorganism activating tank to which sludge is flowed, and in which a native microorganism activator is placed where a colony of the native microorganisms in a spore state is germinated and activated through a proliferation process under conditions where oxygen and organic materials are supplied;
    a first deodorizing tank which preliminarily removes malodorants from untreated matter that passed through the native microorganism activating tank under conditions where oxygen and the activated native microorganisms are continuously supplied; and a second deodorizing tank which completely removes malodorants from untreated matter that passed through the first deodorizing tank under conditions where oxygen and the activated native microorganisms are continuously supplied.

3. The deodorizing apparatus using native microorganisms according to claim 1, wherein each of the native microorganism activating tank, the first deodorizing tank and the second deodorizing tank are connected to a blower and to a diffuser through which oxygen is supplied.

4. The deodorizing apparatus using native microorganisms according to claim 1, further comprising:
- a raw water inlet through which the sludge enters said native microorganism activating tank;
- a first deodorizing tank inlet through which the activated native microorganisms and the sludge enter said first deodorizing tank;
- a second deodorizing tank inlet through which the activated native microorganisms and the sludge enter said second deodorizing tank; and
- a deodorizing tank outlet which discharges completely deodorized sludge from said second deodorizing tank, wherein said inlets and outlet are designed to be arranged in a zigzag manner on each of said tanks based on a diagonal line.

5. The deodorizing apparatus using native microorganisms according to claim 1, wherein the native microorganisms are *Bacillus subtilis* BSDL1 and *Bacillus megaterium* DSM3.

6. The deodorizing apparatus using native microorganisms according to claim 1, wherein the colony of native microorganisms is prepared by culturing *Bacillus subtilis* BSDL1 and *Bacillus megaterium* DSM3 in a spore state, concentrating the culture broth and mixing the concentrated culture broth with inorganic materials, and then molding the mixture.

7. The deodorizing apparatus using native microorganisms according to claim 6, wherein the colony of native microorganisms comprises 5 to 6% of the concentrated culture broth of *Bacillus subtilis* BSDL1 and *Bacillus megaterium* DSM3 based on the weight of the inorganic materials.

8. The deodorizing apparatus using native microorganisms according to claim 1, wherein the dissolved oxygen (DO) level in said native microorganism activating tank is maintained in the range of 0.5 to 0.6 mg/l.

9. The deodorizing apparatus using native microorganisms according to claim 1, wherein the dissolved oxygen (DO) level in said first deodorizing tank is maintained in the range of 0.4 to 0.5 mg/l.

10. The deodorizing apparatus using native microorganisms according to claim 1, wherein the dissolved oxygen (DO) level of said second deodorizing tank is maintained in the range of 0.3 to 0.4 mg/l.

11. The deodorizing apparatus using native microorganisms according to claim 1, wherein the apparatus is for removing malodor generated from any one of a primary sludge (raw sludge), a secondary sludge (activated sludge), and a primary sludge containing night soil produced at the sewage treatment plant, and a concentration tank, a concentrator and a sludge cake of a sewage treatment plant.

12. The deodorizing apparatus using native microorganisms according to claim 1, wherein 10 to 20% of the activated native microorganisms in the treated matter whose reaction is terminated in the second deodorizing tank is returned through a return line to the native microorganism activating tank.

13. The deodorizing apparatus using native microorganisms according to claim 12, wherein the return rate of native microorganisms returning from the second deodorizing tank to the native microorganism activating tank is from 10 to 15% where the sludge is a mixture of a primary sludge and a secondary sludge, and from 20 to 25% where the sludge is a mixture of a primary sludge containing night soil and a secondary sludge.

14. The deodorizing apparatus using native microorganisms according to claim 1, wherein the retention time of the sludge fed into the deodorizing apparatus is from 5 to 6 hours where the sludge is a mixture of a primary sludge and a secondary sludge, and from 7 to 8 hours where the sludge is a mixture of a primary sludge containing night soil and a secondary sludge.

15. The deodorizing apparatus using native microorganisms according to claim 1, wherein a capacity ratio of the native microorganism activating tank, the first deodorizing tank, and the second deodorizing tank is 1:6:3, respectively.

* * * * *